US005265776A

United States Patent [19]

Shabestari

[11] Patent Number: 5,265,776
[45] Date of Patent: Nov. 30, 1993

[54] MANUALLY OPERABLE DISPENSING CAP

[76] Inventor: Leily G. Shabestari, 8325 Old Dominion Dr., McLean, Va. 22102

[21] Appl. No.: 913,911

[22] Filed: Jul. 17, 1992

[51] Int. Cl.⁵ .............................. G01F 11/26
[52] U.S. Cl. .................. 222/454; 221/288
[58] Field of Search ........... 222/454, 425; 221/288

[56] References Cited

U.S. PATENT DOCUMENTS

| | | | |
|---|---|---|---|
| 2,887,254 | 5/1959 | Menderman | 222/454 X |
| 3,342,383 | 9/1967 | Klygis | 222/454 |
| 3,874,564 | 4/1975 | Huneke | 221/288 X |
| 4,723,690 | 2/1988 | vom Hofe | 221/288 X |

Primary Examiner—Richard A. Schacher
Attorney, Agent, or Firm—Elizabeth J. Pawlak

[57] ABSTRACT

A manually operable dispensing cap for use with granulated and powdered material containers such as powdered milk jars, coffee cans and the like is disclosed. The cap has a slider contained within a railing mounted on a main body and which dispenses material to a receiving compartment. The slider is manually operated and regulates the flow of material into the receiving compartment. Overflow is eliminated by locating the receiving cup within close proximity to the mounting via positioning means extending from the top of the cap.

17 Claims, 8 Drawing Sheets

MANUALLY OPERABLE DISPENSING CAP

BACKGROUND OF THE INVENTION

1. Field of the Invention

This invention relates generally to a portable measuring and dispensing device for containers and particularly relates to a closure device which selectively enables measuring, dispensing and storing edible and nonedible dry materials such as powdered milk, baby cereal, coffee, sugar, salt, washing powders and the like from material containers.

2. Description of the Prior Art

The dispensation of granulated and powdered dry materials has inherently characteristic problems to which the present invention is addressed. A need exists for a convenient and inexpensive means for dispensing predetermined quantities of particulate dry food products and non-edible soap products, cleaners, chemicals, and other household ingredients from their containers. Many food products, for example, powdered milk, are commonly supplied in containers with screw-on caps or snap-on cap. In the absence of a measuring and dispensing feature on the cap, the cap must be removed to enable insertion of measuring spoons, scoops, cups or other independent measuring means for removal of the desired quantity from the container. This procedure is inconvenient, unsafe and not hygienic. It is also inconvenient as the continuous opening and closing of the container causes the contents to lose their freshness more rapidly. Also, it requires the use of independent measuring devices which are not always conveniently near, especially when the dispensing procedures take place away from the home. In addition, it is difficult to dispense and/or level off the contents of the scoop or spoon or the like in a precise manner without spilling or otherwise wasting some of the contents especially if the manipulative steps are performed during travel by car or the like. Moreover, such an arrangement does not prevent contamination of the foods. It is practically impossible to keep the measuring and dispensing means free from food residue or user mishandling since this arrangement allows the user to have direct physical contact with the entire content of the container throughout the dispensing process. For example, the very act of removing the scoop or spoon with fingers exposes the remaining content of the container to contamination by bacteria and other airborne particles. Further, a user is not prevented from returning dispensed food or product to the container in such an arrangement, thereby enhancing the possibility of further contamination. Another important disadvantage is that to reach the spoon which is concealed inside the container can be a hazardous procedure. Indeed, a cover of the conventional metal type container used to vacuum pack coffee and other comestibles, must to be removed by an ordinary can opener creating jagged metal edges. More recently, material containers have been used which include tear away portions of the container, and such tear away portions may include both a portion of the side wall of the container and a portion of the top wall of the container. Such containers/cans, once opened, frequently expose sharp edges. Therefore, the very act of removing the measuring and dispensing means from the inside of the container is not only not desirable but dangerous.

All of these problems can be avoided by the use of a cap that has a built-in measuring and dispensing means disposed across the mouth of the container. Such a dispensing cap may be operated by holding the container upside down and operating a dispenser slide or turning a rotor, whereby a quantity fills the cavity in the receiving measuring and dispensing means and is dispensed downward by gravity when the cavity is aligned with an external aperture.

There are several prior art references which are known to the applicant which dispense granular or powder materials, however, none of these adequately meet all of the objectives of the present invention. The large majority of these devices are directed towards storing and dispensing large amounts of materials from stationary containers such as bins.

U.S. Pat. No. 4,176,767 to Franche VI discloses a dog food dispenser with a sliding gate for regulating the flow of dog food and an extension into its hopper for food agitation. A dog food dish is placed underneath the dispenser and the flow of food is regulated manually. Thus there is potential for dispensing food to overflow from the receiving container as food flows continuously until the sliding gate is manually closed.

It is also known to dispense food materials by means of manually rotatable devices. For example, U.S. Pat. No. 1,551,119 to Radek, issued Aug. 25, 1925, describes a dispensing device for sugar or other granular materials. The Radek device is in the form of a cylindrical case having a wheel-shaped structure formed therein with the spokes of the wheel being blades radially extending from a hub portion. As the blades are manually rotated, the granular material within chambers formed between the blades is selectively dispensed through the spout.

U.S. Pat. No. 1,772,377 to Whittle discloses another dispensing device. However, the device has limited utility because it cannot accommodate different containers and has no means to dispense more than one discrete quantity of material from the container.

Also known to the applicant is Orton, U.S. Pat. No. 4,026,442. Orton discloses a household liquid dispenser which utilizes a spring loaded sliding gate to dispense liquid from a hopper. The hopper has a release hole in the bottom, which is opened and closed by the sliding gate. As an extension from the sliding plate is depressed, a channel within the sliding plate is aligned with the release hole in the bottom of the hopper. Liquid enters the channel and travels downward to a dispensing spout also aligned with the channel at its lower end. This apparatus is only useful for extremely free-flowing materials such as liquid due to its path of dispensation which is partially horizontal. As more liquid is dispensed into the channel, liquid in the dispensation channel is forced onward.

A dispenser that has horizontally mounted shaft provided with spaced-apart blades operating on a shaft spanning a dispenser opening is shown in U.S. Pat. No. 2,740,562, issued Apr. 3, 1956, to Bello. This patent, however, is not concerned with dispensing a measured volume but with agitating the material being dispensed. Kaanehe, U.S. Pat. No. 3,344,958, discloses a dry product dispenser having a hopper and funnel for dispensation blocked by a spring loaded sliding valve. The valve must be held open manually in order to dispense material. U.S. Pat. No. 2,626,089 to Osfar discloses a powdered and granulated material container having a flat plate valve with a spring attachment.

Other approaches are shown by U.S. Pat. Nos. 4,674,660, issued Jun. 23, 1987, to Botto; 4,071,171, issued Jan. 31, 1978, to Bassignani; 3,130,874, issued Apr. 28, 1964, to Bulmer; 3,018,924, issued Jan. 30, 1962, to Reed; 2,710,118, issued Jun. 7, 1955, to Stoddard; and U.S. Pat. No. 4,569,463 to Pellegrino issued Feb. 11, 1986 (RE 33,083 Oct. 10, 1989).

To obtain maximum convenience, a dispensing cap for powdered milk and other particulate food products, should provide for delivery of accurately measured amounts directly into a measuring and dispensing means, e.g., spoon or the like, merely by the simple act of sliding a dispenser slide or turning a knob, without requiring any complicated adjustment to the dispenser mechanism for different amounts. Also, such dispenser cap should provide for a measuring and dispensing means disposed on the dispenser cap. Thus, there is a need for a "spoon in the cap" construction which is simple, small and inexpensive and requires little skill to construct or maintain.

To date, no prior art is known that meets all of the objectives of the present invention, that is, to provide a portable dispenser cap for granular or powdered dry materials in a convenient manner, which has the combined features of providing a means for avoiding overflow of the product in the receiving spoon and is cheap to manufacture, due to a simple design and a minimal number of parts. The dispensing cap of the present invention provides such a construction with the added convenience of being adaptable to almost any material from paper to plastic to metal and which provides for ease of manufacture, assembly and maintenance by relatively unskilled persons.

SUMMARY OF THE INVENTION

Accordingly, it is a primary object of the present invention to provide a new, improved and simple means for discharging pre-determined quantities of material which has all the advantages of the prior art caps and none of the disadvantages.

One object of the present invention is to provide a portable dispensing cup which eliminates the need for using a separate measuring cup, spoon or other similar measuring and dispensing means to measure and pour the contents of the container into a filling hole without unnecessary spillage onto the surrounding surfaces whereby the measuring and dispensing are achieved with a one-hand operation by the operator. No spilling of dry material occurs due to the combined action of compartment, slider, railing means and main body.

Another object of the present invention is to provide a new and improved dispensing cap wherein the same utilizes a divided compartment that permit to measure and dispense varied volumes of material from the container.

It is still another object of the present invention to provide a new and improved dispensing cap which has a simple design with relatively few parts so it may be easily and efficiently manufactured and marketed, and which is susceptible of a low cost of manufacturing with regard to both materials and labor, and which accordingly is then susceptible of low prices of sale to the consuming public, thereby making such closure caps economically available to the buying public.

It is a still another object to provide a spoon in the cap construction which is fabricated from molded parts without expensive elements to maintain its structural integrity whereby such assembly and subsequent maintenance and repair are easily accomplished by persons without specialized skills.

And it is an even further object to provide a spoon in the cap combination which may be used on or off of the house.

And it is a still even further object to provide a dispensing cap construction which is lightweight and small, whereby such cap does not need to be removed from the container for travel.

The most preferred embodiment of the dispensing cap for measuring and dispensing dry material from an open ended container is characterized by comprising a main body, a railing means, a slider and a compartment, wherein (a) the main body is attachable across the open end of said container and has an opening and skirt, said skirt being integrally connected to said body and fitted for engagement with the open end of said container and said opening being in direct communication with the interior of the container; (b) the railing means positions a compartment above the opening of said main body and guides a slider in a space between said main body and compartment; said railing means having at least one railing member being shaped and positioned for closely positioning and guiding said slider and said compartment; (c) the slider covers and uncovers the opening in said main body such that when the slider is in an open position, the compartment and interior of the container are in direct communication; and (d) the compartment receives said dry material from said container and having at least one fixed volume and a means for external delivery of the measured content of said compartment. Since the main body of the invention has a skirt sized for a substantially tight fit over the open end of a conventional container, the inventive device can be easily mounted on many types of containers, thus allowing great versatility, and thereby enabling its use with containers of a variety of sizes and shapes, such as cans, cardboard containers, different glass or plastic containers which hold dry food products and non-edible soap products, cleaners, chemicals, etc. When the user of my inventive dispensing cap operatively attached to the container, desires material from the container, one secures the pivotable bottom plate in a closed position and manually slides the slider into the opened position. With the container in its inverted position, the slider, when moved away from the closed position, slides parallel to the planar surface of the main body. With the container still inverted, the slider is displaced into the position for closing the passage between the opening and the compartment, thereby substantially sealing the passage and substantially preventing further transmission of the contents of the container through the opening into the compartment. The measured material can be dispensed and the container returned to its upright position. The amount of the material dispensed depends upon the position of the slider relative to the compartment.

While a preferred form of the invention comprises the features just referred to, it is also possible to have a compartment of a detachable type, comprising a bottom-closed member removably supported by the runner, sliding within the compartment guiding members attached to the railing members and being in a position to receive in its cavity the dry material when the slider is in the open position, and detachable from its supported position on the compartment guiding means and dumping the collected material into a receiving cup or the like when the slider is in the closed position.

It is also within the scope of the invention to provide a dispensing cup usable on the open end of soap powder/detergent containers and the like for a variety of household and industrial applications.

For the purpose of clarifying the nature of the present invention, exemplary embodiments of the invention are illustrated in the hereinbelow-described figures of the accompanying drawings, and are described in detail hereinafter.

Further objects and advantages of my invention will become apparent from a further consideration of the drawings and ensuing description thereof.

BRIEF DESCRIPTION OF THE DRAWINGS

Like references refer to like parts throughout the views of the drawings.

DETAILED DESCRIPTION OF THE PREFERRED EMBODIMENTS

Figure 1:
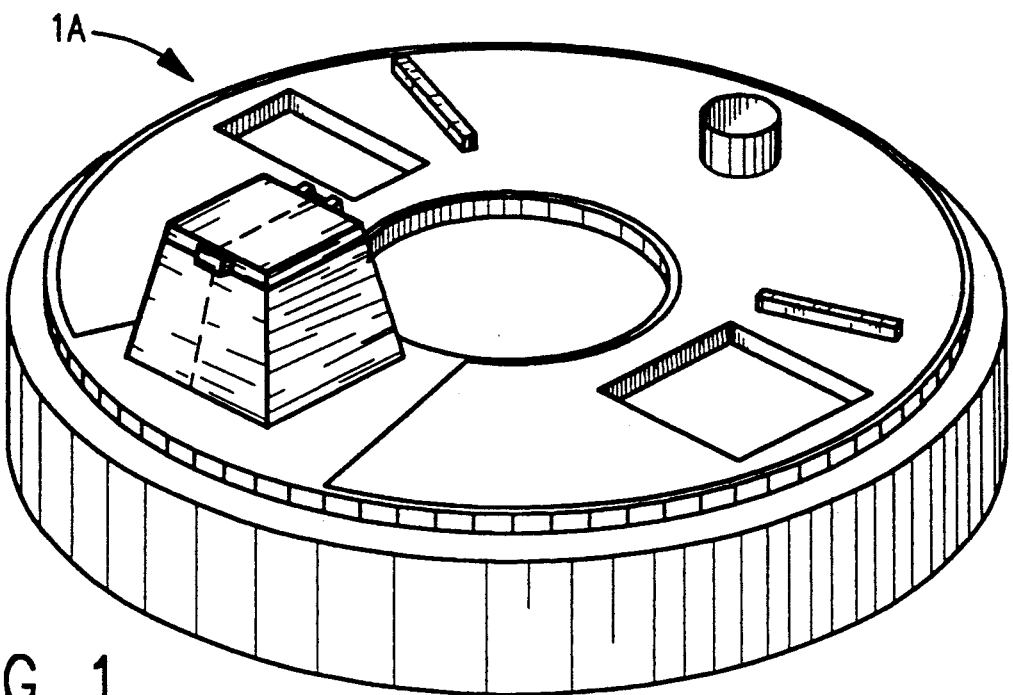
FIG. 1 is a three-dimensional view of a first embodiment of the dispensing cap according to the invention, in the open position.

Referring now to the drawings, particularly to FIGS. 1-8, the illustrated dispensing cap is constructed in accordance with the present invention and generally designated 1a, 1b, 1c and 1d, respectively. It should be noted that in all shown exemplary embodiments of my invention like numerals represent like parts. Also, it is to be understood that all or some of the alternatives are interchangeable in any of the embodiments. Generally, the inventive device is a four-piece dispensing cap comprising a main body 2, a slider 3, a railing means 4 and a compartment 5, the later being integrally attached to the railing means 4 or slidably received within the compartment support means 33 formed within the railing means 4.

The exemplary first embodiment of the invention is depicted in FIGS. 1, 2, 9, 10 and 16, inclusive. As illustrated at best in FIG. 9, the main body 2 is provided of any desired size and configuration and has a horizontally-disposed base 6, a vertically-disposed skirt 7 extending upwardly from the base 6 and an opening 8 in said base 6. The exemplary disc-like main body 2 is most preferably from about two to about five inches in diameter and has the skirt 7 annular in shape and integrally connected with the base 6 and fitted for engagement with the open end of a container.

Preferably, the skirt 7 is sized for a press snap-on fit over the open end of a conventional container of the type used to pack dry foodstuffs such as coffee, powdered baby milk, baby cereal, etc., and the opposite ends of which are secured to the container body by a rolled rim which projects slightly beyond the exterior surface of the container sidewall. Since such containers often come equipped with a plastic cover assembled to one end for subsequent use to cover the open end after the latter has been removed by a can opener, dispensing cap 1 of this invention is applied to the container in lieu of such covers. Alternatively, the skirt 7 may be internally threaded for a screw-on fit over the end of a conventional foodstuff jar, can or container which typically is of the type employed to pack powdered instant coffee. It will therefore be appreciated that the threads are provided in such size and pitch that they match the external threads of the jar or container.

Figure 9:
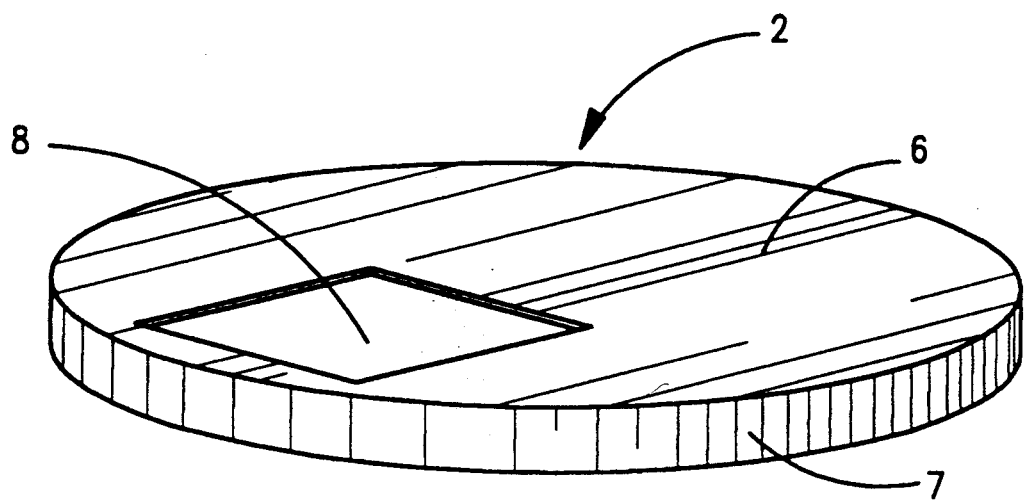
FIG. 9 is a view of the main body according to the invention, prior to assembly.

The opening 8 is in direct communication with interior of the container. The shape and position of the opening 8 vary depending upon the nature and intended uses of dry material to be dispensed and the shape of the container. However, the opening 8 should be large enough to permit free flow of a desired quantity of material from the container. The exemplary shape of the opening 8 is shown in FIG. 9. The substantially rectangular opening 8 is preferably from about one to about two inches wide and from about one to two inches long. Although the opening 8 is shown as being substantially rectangular in shape, this is primarily for convenience and any desired shape may be employed. Accordingly, it is within the concept of this invention that the opening 8 has, for example, substantially square, substantially octagonal or substantially disc-like shape. The primary criterion for the overall design of the opening 8 is that the shape and measurements of the opening 8 correspond substantially to sizes and shapes of a compartment 5.

Although the base 6 of the main body 2 shown in the detail-enlarged three-dimensional view in FIG. 9 is disc-like in shape, it is also not necessarily limited to being a substantially disc-like shape. It is within the concept of this invention that the main body 2 has any other shape, so long as it adheres to the requirement of substantially tight-fit over the container including a box or carton. Indeed, it should be noted that the size and shape of the base 6 as well as the skirt 7 are limited only by the size and the shape of the container. The dispensing cap of this invention, once applied to the container, may remain permanently on the container.

Fixed in the base 6 of the main body 2 in communicating relation with the opening 6 are the railing means 4 which generally serves to guide the slider 3 horizontally just above or below the top of main body 2 and below the top of the compartment 5 and to position the compartment 5 just above the slider 3 and the opening 8. By the slider 3 is meant a substantially flat body designed and arranged so as to allow or prevent (depending on the mode of an operation) measuring and dispensing the desired volume of the compartment 5 from the container to the compartment 5 through the opening 8.

Generally, the railing means 4 takes the form of a hollow rectilinear or circular frame-like structure of larger measurements than the slider 3 adapted to either rest upon or be attached to, or mounted, preferably integrally, on a surface of the base 6. Alternatively, the railing means 4 may be positioned just below under the base 6 and extend out of the base 6 through the opening 8. The railing means 4 comprise plurality of railing members 9 in the cross-sectional shape such as to provide a track for guiding the slider 3 and holding it in place. Preferably, the railing members 9 have the cross-sectional shape of "I", inverted "L", inverted "U", or combination thereof and are arranged in such a manner that the frame-like structure defines and limits the extent of the slidable movement of the slider 3 whereby the lower portion of the railing means 4 is connected to the surface of the base 6 and the upper portion of the railing means 4 is connected, as hereinafter described, to the positioning means 37 of the compartment 5 so as to support and position the compartment 5 and interior of the container in direct communication when the slider 3 is in the open position while allowing the slider 3 to freely move substantially parallel to the base 6 of the main body 2.

Figure 10:
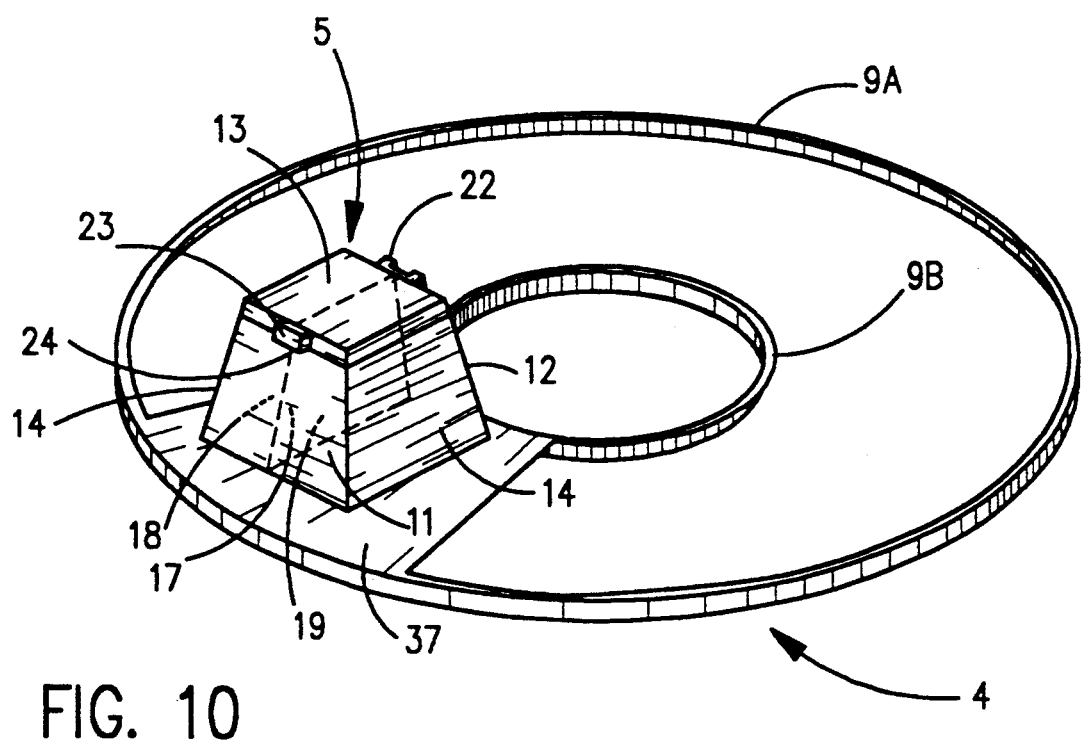
FIG. 10 is a detail enlarged three-dimensional view, showing the railing means integrally connected with the compartment of the first embodiment as shown in FIG. 1, of said dispensing cap.

The exemplary first embodiment of the invention has the railing means 4 in the form of a circular frame-like structure shown at its best in FIG. 10. The illustrated railing means 4 has a pair of substantially circular (in planar cross-section) railing members 9 which can be characterized for the sake of clarity and simplicity as an outer co-axial rim 9a and an inner co-axial rim 9b and are adapted as to provide a track for a slider 3 subsequently described herein. The diameter of outer rim 9a is substantially equal or slightly smaller than the diameter of the base 6 while the diameter of the inner co-axial rim 9b is less than that of the outer co-axial rim 9a with the proviso that the difference between the diameters of the both railing members 9a and 9b would be slightly bigger than the width of slider 3 movably disposed therebetween. In the example illustrated in FIG. 10, the railing means 4 is integrally and stationarily connected with the positioning means 37 of the compartment 5, the latter being subsequently described herein.

Dry material from the container (not shown) is dispensed into the compartment 5, the capacity of which can vary with the desired amount of dispensed material. The compartment 5 may be of dimensions slightly greater than the corresponding opening 8 thereby preventing from spilling of the product by force of gravity. In the exemplary embodiment of the invention illustrated in FIG. 10, the compartment 5 is a generally rectangular-shaped, two-piece member which includes spaced, preferably parallel front and rear walls 11 and 12, a bottom plate 13 and at least a pair of spaced, preferably parallel sidewalls 14 and an open top 15 which provides access into the container. The walls 11, 12 and 14 are substantially rectangularly arranged and integrally connected therearound so as to be of substantially parallelopiped shape terminating in the top defined by a surrounding rectangular top edge 16 which in turn integrally and outwardly extends into the positioning means 37 preferably integrally connected with the upper portion of the railing means 4 as best illustrated in FIG. 10. The compartment of FIGS. 1-4, 10 and 11 is shown having a spaced, substantially parallel partition wall 17 dividing compartment 5 into a pair of sub-compartments 18 and 19. The partition wall 17 is substantially parallel to container sidewalls 14, so that each of the sub-compartments 18, 19 is generally rectangularly-shaped. It should be noted that the sub-compartment 18 is, in horizontal cross-section, a mirror image of the aperture 20 of the slider 3, as described below. Accordingly, it should be understood that the partition wall 17 is positioned within the compartment 5 in such a manner so as to act in concert with the slider 3 to measure and dispense the dry material, i.e., so they are aligned with each other whereby the whole or one-half the total volume of the compartment 5 may be dispensed. It should be further noted that although the partition wall 17 is shown as being substantially parallel to the sidewalls 14, this is primarily for convenience and any desired positioning may be employed. Accordingly, it is within the concept of this invention that the partition wall 17 divides compartment 5 into a pair of sub-compartments 18 and 19 which have, in horizontal cross-section, for example, substantially triangular, substantially octagonal or substantially half-moon-like shape. The primary criterion for the overall positioning of the partition wall 17 is that the cavity of the compartment 5 is divided from the top to the bottom by said partition wall 17 having the vertical height identical to the sidewalls 13 and/or the front and rear walls 11 and 12 and the combination thereof, and that the shape of the sub-compartment 18 corresponds substantially to the shape of the aperture 20. Moreover, different shapes and forms of the compartment 5, such as a scoop or cup, cylinders may also be employed, although the box-like structure is preferred. It is further within the contemplation of the present invention to utilize a plurality of partition walls 17 defining more than two positions of the collection cavities and for these cavities to define volumes varied relative to one another. From the foregoing it is understood that the compartment 5 can have more or less than two sub-compartments without affecting the concept of the invention. Two sub-compartments merely has been determined to be the most desirable number. Accordingly, it can be seen that the compartment 5 can be of any shape and can be divided to almost any configuration and number of sub-compartments in this manner.

Figure 11:
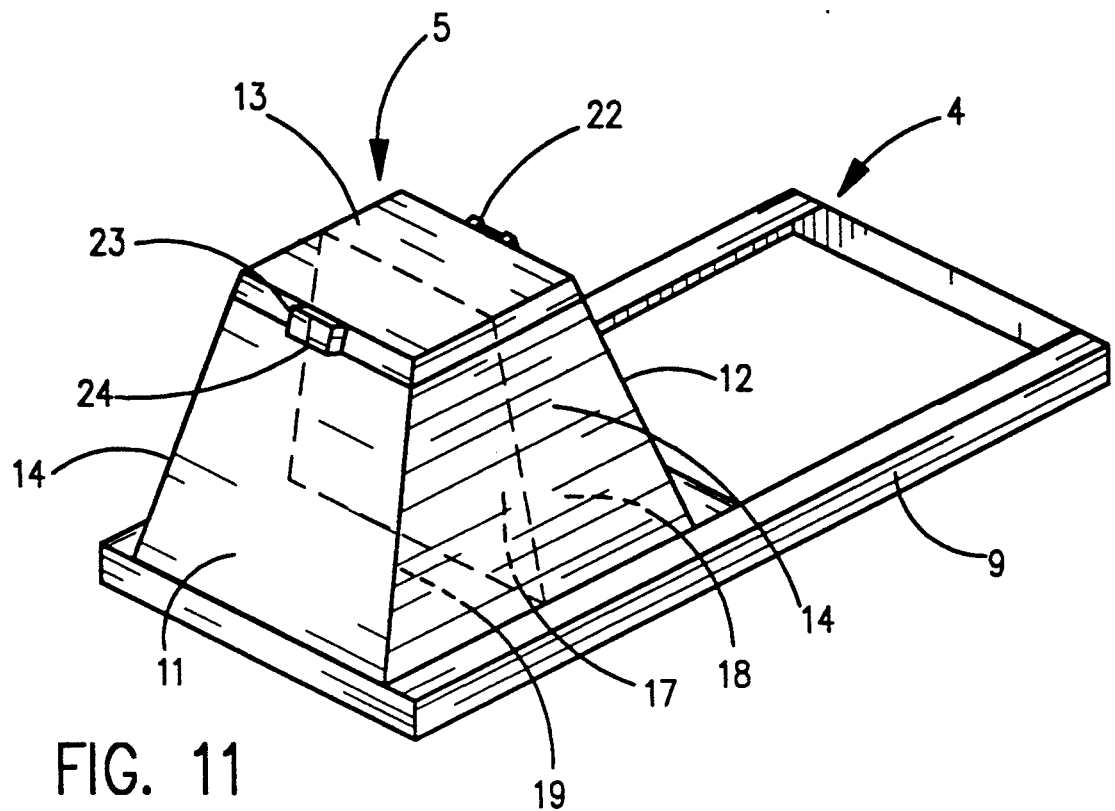
FIG. 11 is a detail enlarged three-dimensional view, showing the railing means integrally connected with the compartment of the second embodiment as shown in FIG. 3, of the dispensing cap according to this invention.

The bottom plate 13 is in the form of a tiltable lid having a hinge 22, which is shown attached to the bottom plate 13 and the lower portion of the rear wall 12, and is releasably attached to the front wall 11 of the compartment 5 by means of the engagement of a pivotal closure member 23, which is shown attached to the lower portion of said front wall 12, with a closure-member keeper 24, which is shown attached to the lid structure 13 in a substantially air tight, sealed relation (indicated in FIGS. 10 and 11). The bottom plate 13 may be pivoted open to dispense the dry material contained in the compartment 5. Hinges are very well-known in the art, as are the closure members and closure-member keepers for pivotably attaching the lid to the compartment. Accordingly, it is believed that it would be redundant to repeat well-known prior art showings of such means, which are merely indicated generally by the reference numerals 22-24 in FIGS. 1-4 and 10-11.

Figure 2:
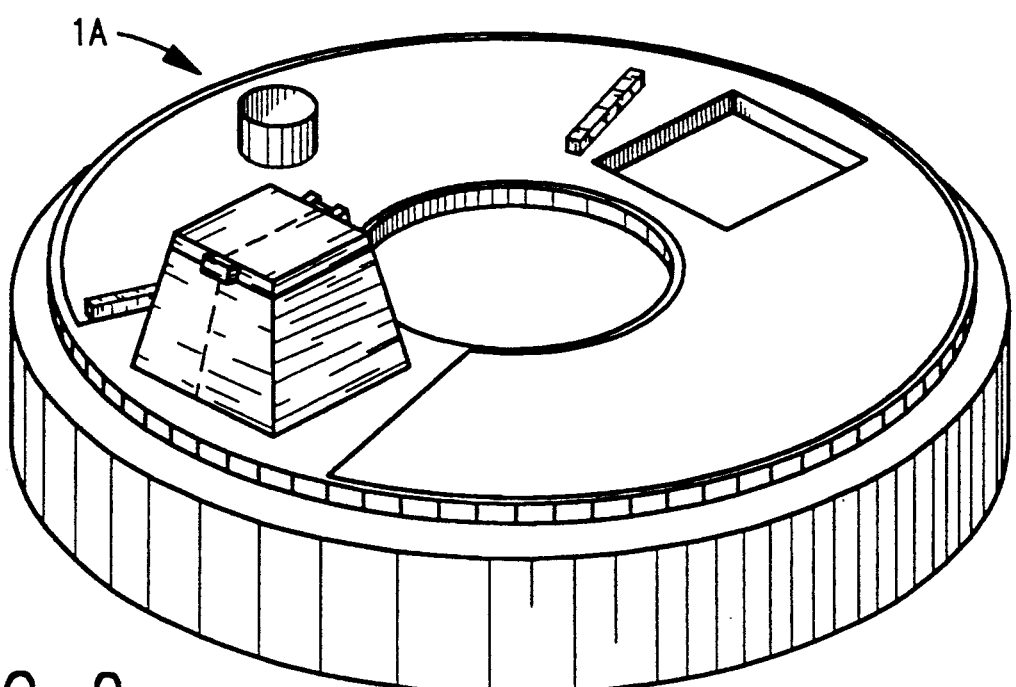
FIG. 2 is a three-dimensional view of the dispensing cap corresponding to FIG. 1 but in the closed position.
Figure 16:
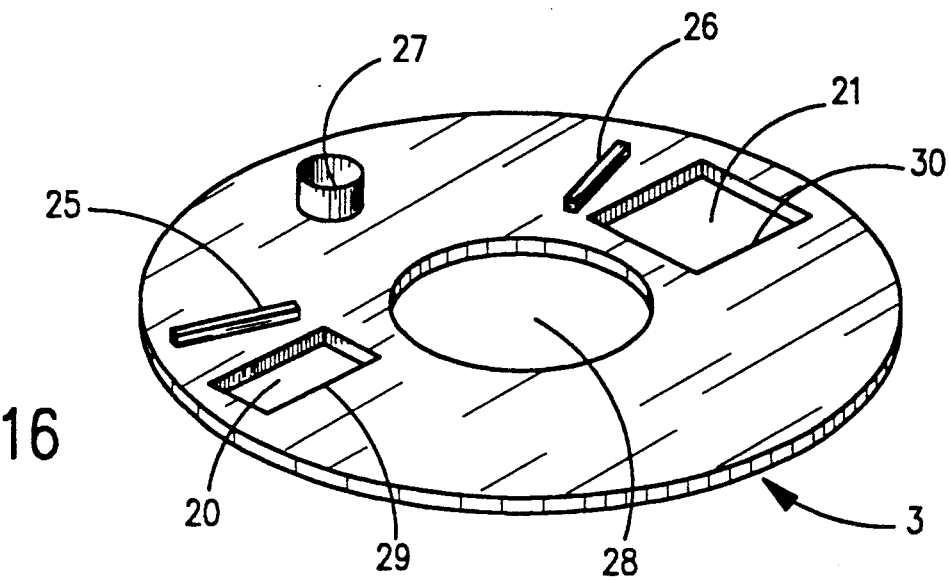
FIG. 16 is a detail enlarged three-dimensional view, showing the slider of the first embodiment as shown in FIG. 1 of said dispensing cap.
Figure 17:
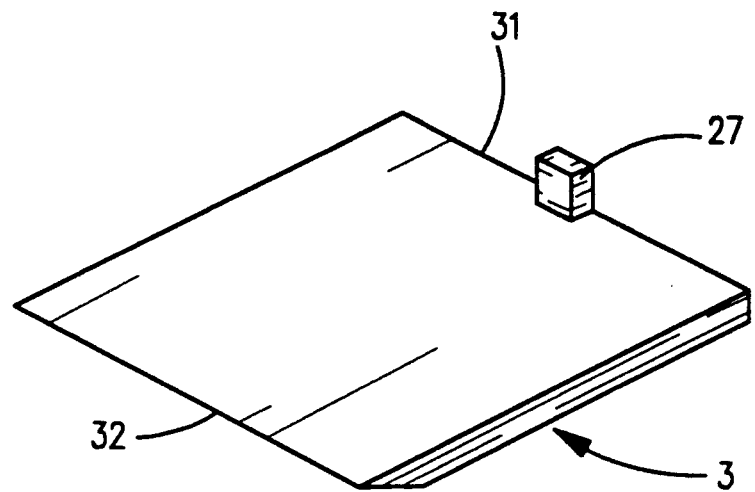
FIG. 17 is a detail enlarged three-dimensional view, showing the slider of the second, third and fourth embodiments of the dispensing cap of the invention.

The exemplary first form of the closure device generally designated by the numeral 1a in accordance with the present invention and illustrated in FIGS. 1-2, has the slider 3 being essentially a substantially flat plate. As illustrated at its best in FIG. 16, the slider 3 is in the shape of a disk and comprises at least two apertures, i.e., first and second apertures 20 and 21, at least first and second travel-limiting means 25 and 26, a grasping means 27 and a cutout 28. Although the cutout 28 is illustrated in FIG. 16 as being preferably substantially circular, it is within the concept of this invention that it has, for example, substantially decagonal, substantially octagonal and the like shape. The cutout 28 and the outer diameter of the slider 3 are so dimensioned that they permits the slider 3 to be installed movably and directly over or under the surface of the base 6 and in the area defined by the said base 6, the outer part of the inner co-axial rim 9b and the inner part of the outer co-axial rim 9a of the railing means 4 as shown at its best in FIGS. 1 and 2. The thickness of the slider 3 should be slightly less than that of the both rims 9a and 9b and sufficiently rigid to permit it to be freely rotated substantially parallel to the surface of the base 6 and in the area defined by the outer part of the inner co-axial rim 9b and the inner part of the outer co-axial rim 9b. The shape and position of the first aperture 20 is substantially similar to and will vary depending upon the shape (in a horizontal cross-section) and position of the sub-compartment 18. Similarly, the shape and position of the second aperture 21 is substantially similar to and will vary depending upon the shape (in a horizontal cross-section) and position of the compartment 5. Accordingly, although the first aperture 20 and the second aperture 21 are shown as being substantially rectangular in shape, this is primarily for convenience and any desired shape may be employed so long the shape of the aperture substantially similar to the shape of the corresponding compartment/sub-compartment. Accordingly, it is within the concept of this invention that the both apertures (20 and 21) have, for example, a substantially square, substantially triangular or substantially disc-like shape. An important feature of the slider 3 is the edges of the first and second apertures closest to the compartment 5 are bevelled so that they are in formed as cutting edges. When the slider 3 is turned closed, the bevelled edge smooths the top of the mound of material collected in the compartment 5. The just-described feature is illustrated in FIG. 17 and designated 29 and 30. The proper angle for the cutting edge is well known to those skilled in the art and can be numerically solved from any table of natural trigonometric functions.

The slider 3 is so configured that the extent of the circularly extending movement is preferably limited by travel-limiting means 25 and 26, so as to allow the slider 3 to be rotably moved between positions defining the whole or one-half the total volume of compartment 5 and the opening-closed position. In the example illustrated in FIG. 16 such travel-limiting 25 and 26 are preferably integrally carried by the top surface of the slider 3 and extending radially outwardly from cutout 28 at a certain spacing near the apertures 20 and 21. While the travel-limiting means 25 and 26 are shown in preferred locations, alternate locations might be chosen to achieve the desired result of measuring and dispensing.

The slider 3 also includes the grasping means 27 which is preferably integrally connected with the slider in such manner as to permit the grasping means 27 to be easily grasped between the fingers. Although the grasping means 27 is shown in FIGS. 1, 2 and 16 as being in the shape of a knob, this is primarily for convenience and any desired grasping means may be employed. Grasping means such as handles, knobs, push-elements and the like are very well-known in the art, and therefore, it is believed that it would be redundant to repeat well-known prior art showings of such means. Optionally, the dispensing cap 1 may have one or more bushings (not shown) for maintaining a spacing of the slider 3 relative to the base 6 and further for enhancing rotation of the slider 3 relative to the compartment 5 when the embodiment is in operation. Also, it is apparent that other suitable shapes of the slider 3 such as an octagonal shape, decagonal shape and the like may be readily used to practice my invention and are well known to those skilled in the art.

FIGS. 1 and 2 also illustrate the exemplary first embodiment of the present invention shown in FIG. 16 as it relates to the operation of the slider 3. The slider 3 is shown to lie between the parallel plane of the base 6 and the parallel plane of the open top 15 of the compartment 5 and the railing means 4. When the user of the dispensing cap 1 operatively attached to the container desires material from the container, he/she secures the pivotable bottom plate 13 in a closed position and manually slides the slider 3 is opening-opened position. It should be noted that the slider 3 may be turned (dialed) into the selected position, i.e., in alignment with the compartment 5 or the sub-compartment 18 by following either direction parallel to the surface of the base 6 by grasping the grasping means 27 and rotating thereby the slider 3 while holding the container equipped with the inventive cap 1, fast. When the container is turned upside down by the user, the material freely flows downward by the force of gravity, from the container into the selected cavity, i.e., the compartment 5 or the sub-compartment 18. In other words, in order to measure and dispense the one-half the total volume of the compartment 5 from the container to the sub-compartment 18 through the opening 8 it is sufficient to manually exert a rotational movement on the slider 3 in a counter-screwing direction, i.e., from the position of FIG. 1 to the position of FIG. 2, because the matching shapes of the aperture 20 and the sub-compartment 18 will allow dry material to pass from the container to the selected cavity. By moving the slider 3 in the opening-closed position, the slider 3 closes the opening 8 and smooths the top of the mound of material collected in the cavity. The pivotable bottom plate 13 can be now placed in its open dispensing position.

Figure 3:
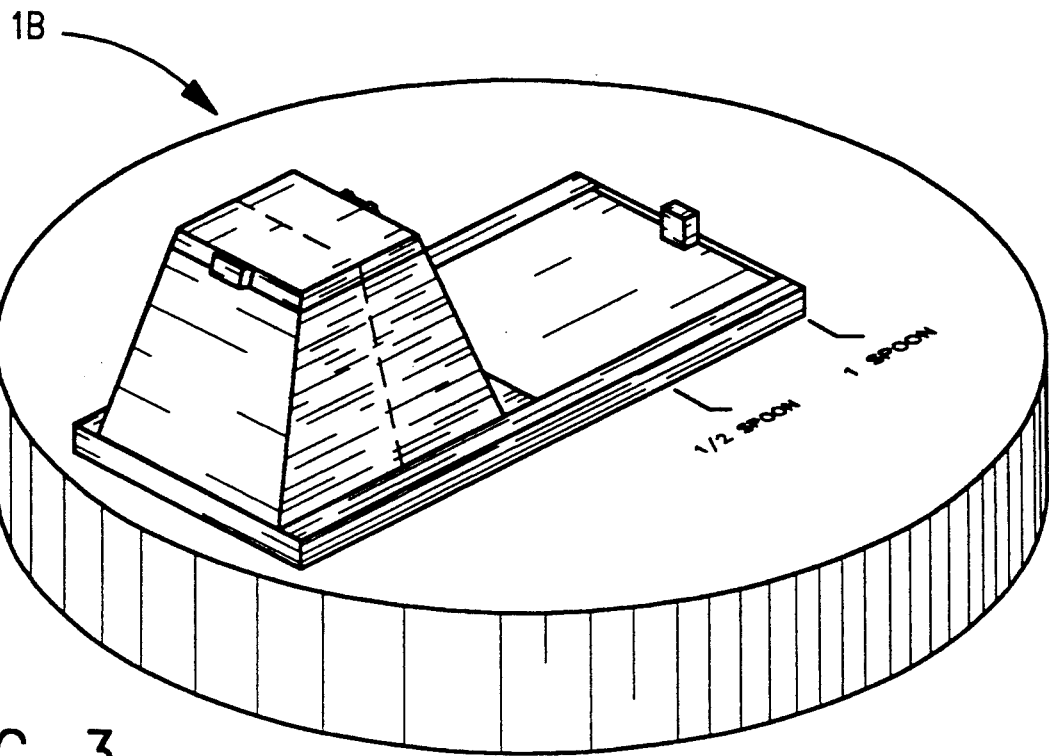
FIG. 3 is a three-dimensional view of a second embodiment of the dispensing cap according to the invention, in the open position.
Figure 4:
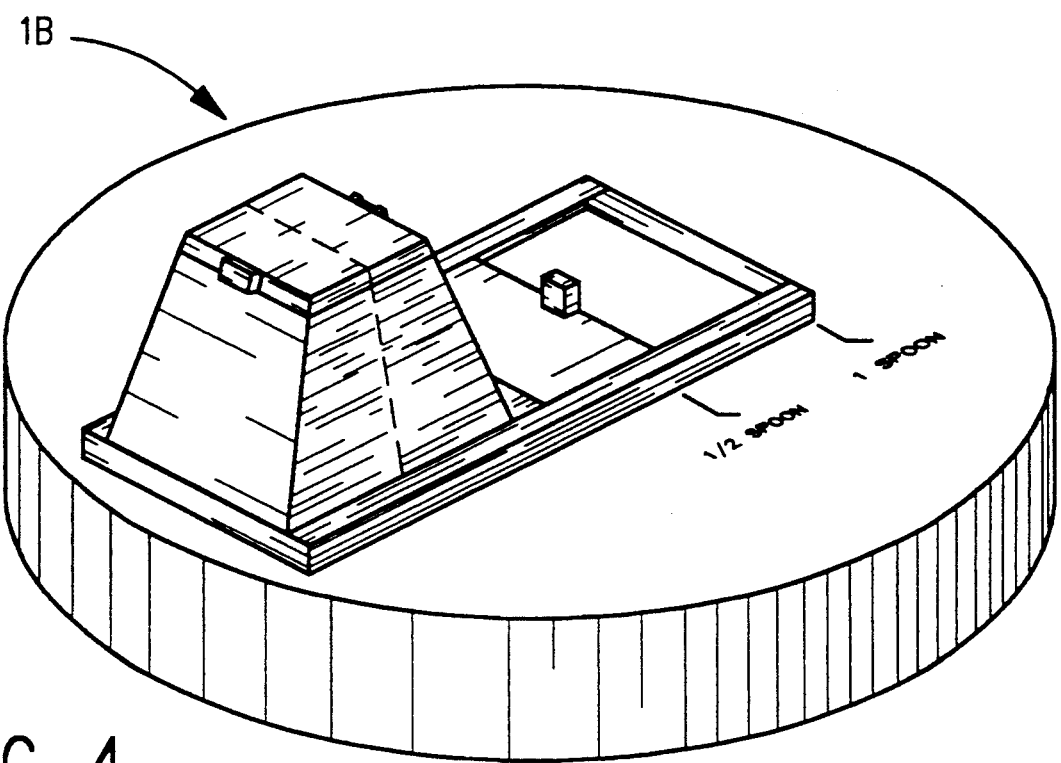
FIG. 4 is a three-dimensional view of the dispensing cap corresponding to FIG. 3 but in the closed position.

The exemplary second form of the invention is depicted in FIGS. 3, 4, 11 and 17, inclusive. FIG. 11 illustrates in detail a slightly modified form of the railing means, indicated generally at 4 in previous description, integrally connected with the compartment 5 as perhaps best shown in FIG. 10. Since the views illustrate a very slight modification of said railing means 4, it will be designated by similar reference numerals, followed by the letter c. However, it will be noted that the only difference in the railing means 4b is in the configuration of the railing members thereof, indicated at 9c and 9d, which otherwise is substantially similar to the original railing members 9a and 9b of the railing means 4 previously described. The illustrated railing means 4 takes the form of a hollow rectilinear frame-like structure of larger measurements than the slider 3 adapted to either rest upon or be attached to, or mounted, preferably integrally, on a surface of the base 6 and comprises a pair of inverted "L" shaped railing members 9c situated along opposite top edges of opening 8 such that the "L" extends over and above its top edges at sufficient distance to form tracks within which the slider 3 is slidable between a first position in which a portion of the slider 8 obstructs the opening 6 between the container and a compartment 5 to prevent flow of dry material from the container through the opening 8 and a second position removed from the opening 8 to enable flow of said material from the container through the opening 6 as shown in FIGS. 3 and 4. The railing members 9c, the length of which should at least double the length of the slider 3, are connected on their distal ends by the railing members 9d providing thereby stops for the slider 3 whereby the extreme positions of the slider 3 are defined. In other words, the railing members 9c provide a track on the lateral sides of the opening 8 and are preferably fixed on bottom surface of the base 6 for guiding the slider 3 so it slides freely back and forth therein and holding it in place. It should be understood that it is within the concept of this invention that the horizontally disposed railing members may have any other shape, so long as they adhere to the requirement of guiding the slider 8 for movement between the "opening-closed" and "opening open" positions. For example, the longitudinal members 9c may be positioned along opposite edges of the opening 6 so as to form "C" shaped channels in which the slider 3 slide over said members (not shown).

FIG. 17 is a detailed view very similar to at least a portion of FIG. 16, and illustrates a further very slight constructional variation of the slider 3 wherein corresponding parts are designated by similar reference numerals, followed by the "b", however. In this modification, it will be noted that the substantially disk-like shape of the slider has been substituted with a substantially rectangular shape. Preferably, the slider 3b is a flat plate in the shape of the horizontal cross-section of the compartment. Additionally, it will be noted that the apertures 20 and 21 as well as the travel-limiting means 25 and 26 are eliminated entirely from the slider 3b. To facilitate opening and closing the opening 8, slider 3b is provided at the distal end 31 with the grasping means 27b extending from and being effectively integral with said end in such manner as to permit the grasping means 27b to be readily and securely grasped by the fingers. The slider 3b may be moved by holding the grasping means 27b and displaced toward and away from the closed position. As shown in FIGS. 3 and 4, the slider 3b substantially fills opening 8 in the closed position and is substantially linearly slidable between the closed position wherein slider 3b is disposed over the opening 8 to substantially occlude the passage through this opening (see FIG. 3) and either a position illustrated in FIG. 4 wherein the distal end 31 of the slider 3b lies in a position spaced from the opening 8 so that the opening 8 is aligned with the sub-compartment 18 or a position wherein the distal end 31 of the slider 3b lies in a position spaced from the opening 8 so that the opening 8 is aligned with the compartment 5 (not shown) thereby permitting passage of dry material through the opening 8. In other words, the amount of the dispensed material depends upon the position of movable element, i.e., slider 3b. With the container in its inverted position, the slider 8b, when pushed away from the closed position, slides under the planar bottom surface of the main body 2. When the container is still inverted, the slider 8 is displaced into the position closing the passage between the opening 6 and the compartment 5, thereby substantially sealing the passage and substantially preventing further transmission of the contents of the container through the opening 6 into the compartment 10. The container can then be disposed in its upright condition. It just has been shown that the amount of the dispensed material depends upon the position of slider 3b during the measuring step. And although the FIGS. 3 and 4 show the mode of operation in which the whole or one-half the total volume of the compartment 5 may be dispensed, this is primarily for convenience and it is further within the contemplation of my invention to utilize a plurality of partition walls defining more than two positions of the collection cavities and for these cavities to define the positions of the slider 3b relative to the corresponding cavities.

An important feature of the slider 8a is that a proximal end 32 forms a cutting edge. A perspective view of the exemplary form is illustrated in FIG. 17, wherein the lateral side of the slider 3b is in the shape of a trapezoid having an acute angle at the proximal part 32 so as to form said cutting. When the slider 3b is pushed closed, it smooths the top of the mound of material collected in the compartment 5. The slider 3b is preferably from about 1 to about 3 inches wide, from about 0.5 to about 4 inches long and from about 0.01 to 0.2 inch thick at its distal end. Optionally, in order to prevent chipping and possible breakage, the four corners may be given a radius (not shown). It should be noted that the slider 3b may be slightly larger in measurements than the compartment 5 and the opening 8 so it will project beyond the ends on the compartment 5 and into the space in front of the opening 8. The just described configuration has all of the advantages of the FIG. 1 version, as to the mode of operation thereof, and also has the additional advantages of manufacturing simplification for the production of the slider 3b, which no longer carries a cost-increasing apertures and travel-limiting means similar to that shown at 20-21 and 25-26, respectively in the first form of the invention.

Figure 5:
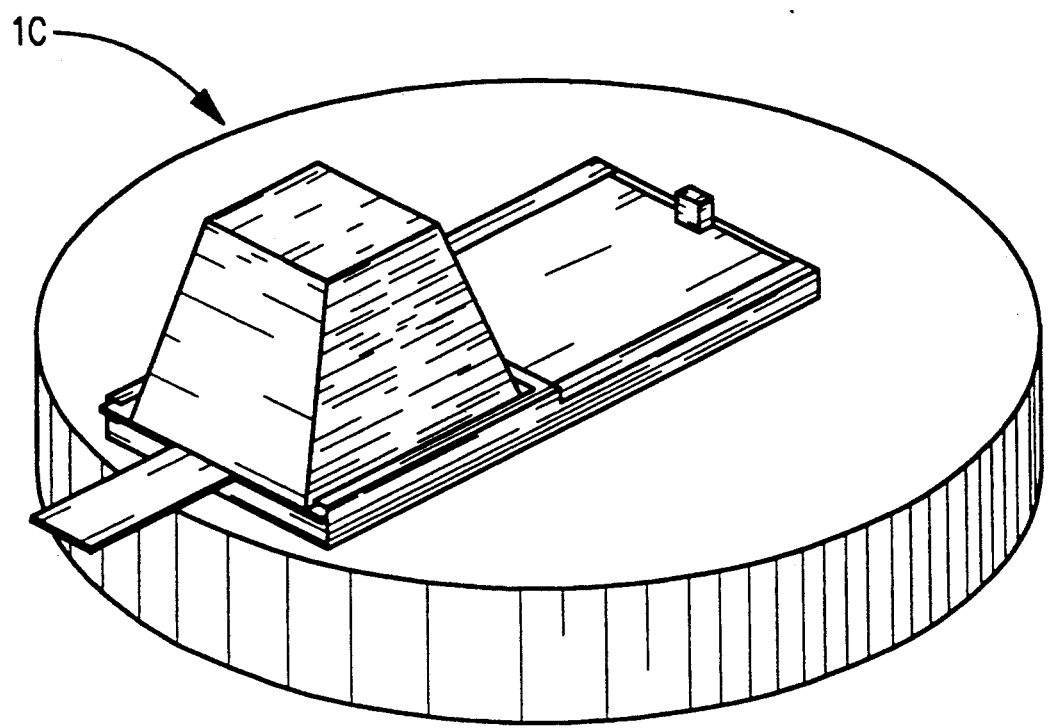
FIG. 5 is a three-dimensional view of a third embodiment of the dispensing cap of the invention in the open position.
Figure 12:
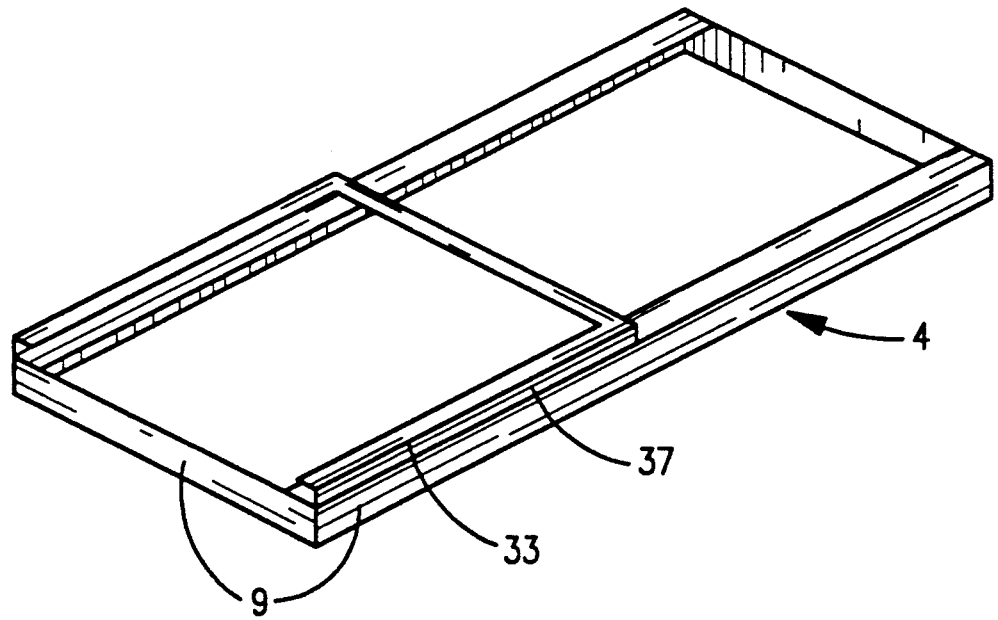
FIG. 12 is a detail enlarged three-dimensional view, showing the railing means of the third embodiment as shown in FIG. 5 of a dispensing cap of this invention.
Figure 13:
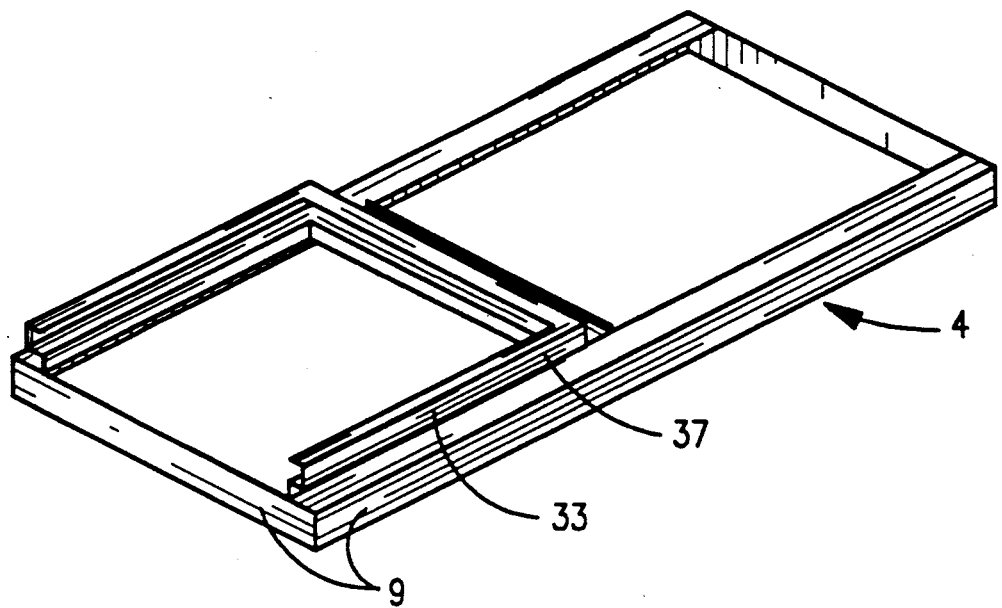
FIG. 13 is a detailed view of the railing means of the fourth embodiment as shown in FIG. 7 of this invention.
Figure 14:
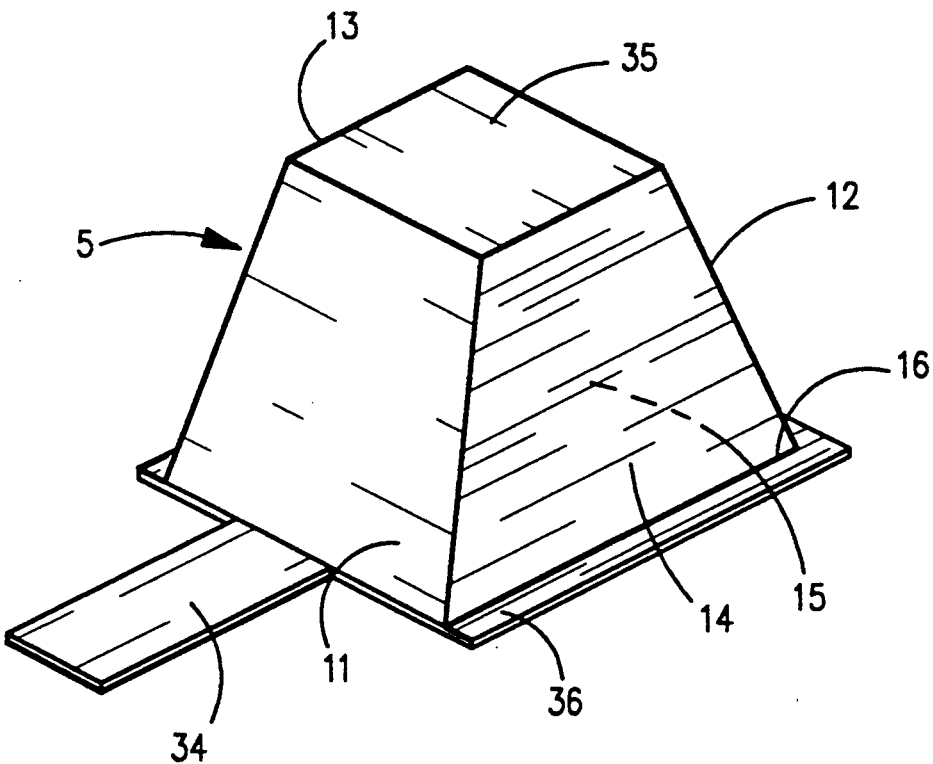
FIG. 14 is a detail enlarged three-dimensional view, showing the compartment of the third embodiment as shown in FIG. 5 of said dispensing cap, prior to assembly.
Figure 15:
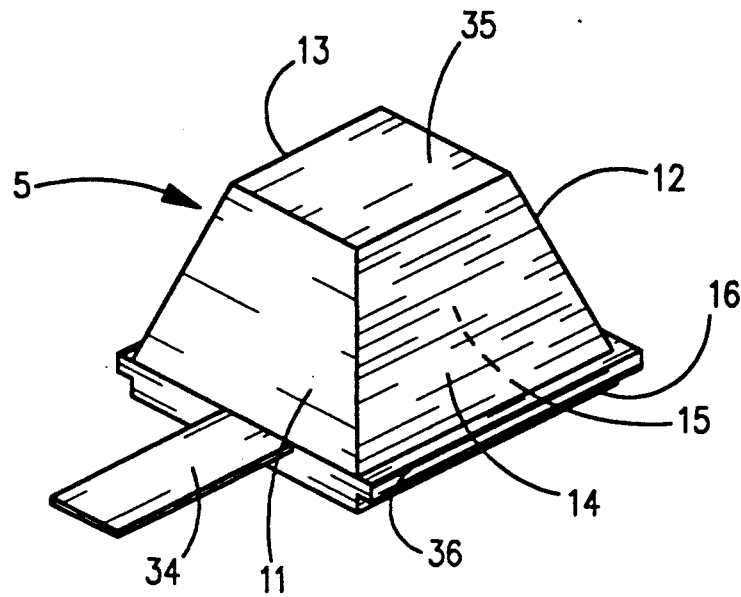
FIG. 15 is a detail enlarged three-dimensional view, showing the compartment of the dispensing cap corresponding to FIGS. 7 and 8.

The third embodiment of the dispensing cap according to the present invention is depicted in FIGS. 5, 6, 12 and 14, inclusive, and incorporates the compartment 5 that is readily detachable from the top of the cap (as designated by the arrow shown in FIG. 5). With particular reference to FIG. 14, a perspective view of the compartment 5 slidably detached from the dispensing cap is shown. FIG. 12 illustrates in a detail the railing means, indicated generally 4b in the description of the exemplary second form of the invention, integrally connected with the positioning means 37 of the compartment 5 as perhaps best shown in FIG. 10. Since all these views illustrate a very slight modification of said compartment 5, it will be designated by similar reference numerals, followed by the letter c.

In this modification, as best illustrated in FIG 14, it will be noted that the major difference is the fact that the compartment 5c is detachable and the bottom-closing plate 13 no longer in the form of a tiltable lid, but instead integrally attaches to the bottom portions of the walls 11, 12 and 14. This means that the compartment 5c may be now easily fabricated by a molding process in the suitable material and when compartment 5c is detached, it will contain a predetermined measured quantity of dispensed material from the container.

The compartment 5c is provided at least one suitable air vent 35 which is necessary in measuring operations. The air vent 35 may simply be a hole or a series of holes, preferably in the bottom plate 13 as depicted in FIGS. 14. Generally, one hole per compartment is preferred since it provides the necessary venting during measuring operations but allows the inner surface of the compartment to be only minimally exposed to contamination. The air vents are preferably kept extremely small so as to limit any admission of moisture.

Figure 6:
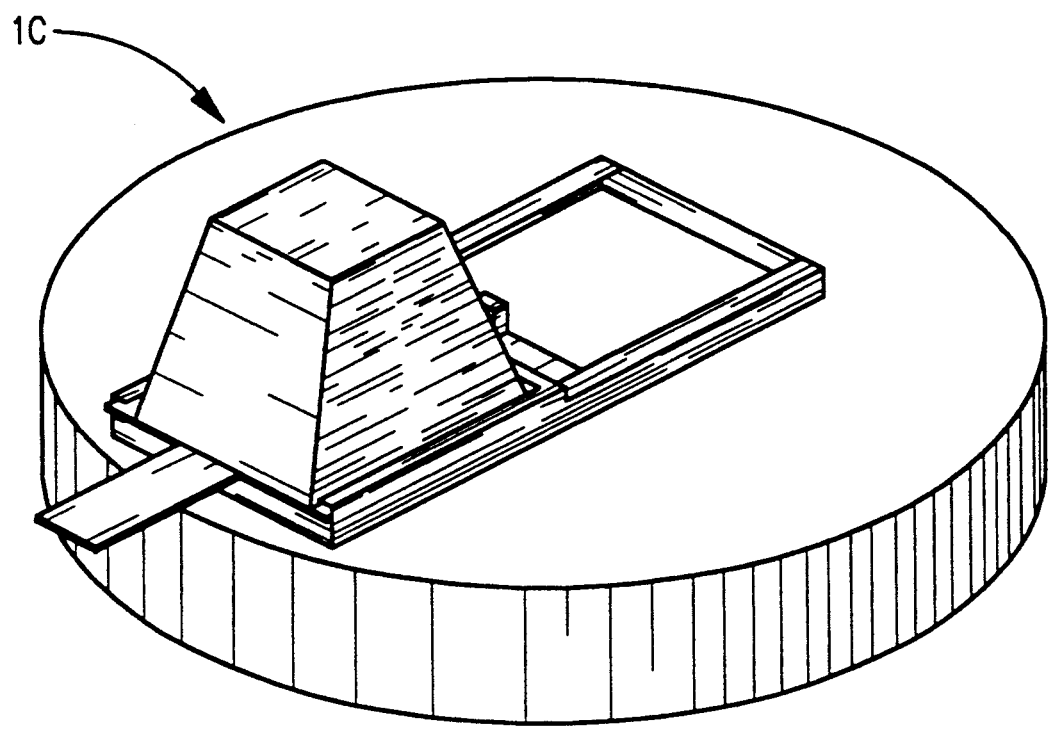
FIG. 6 is a three-dimensional view of the dispensing cap corresponding to FIG. 5, but in the closed position.
Figure 7:
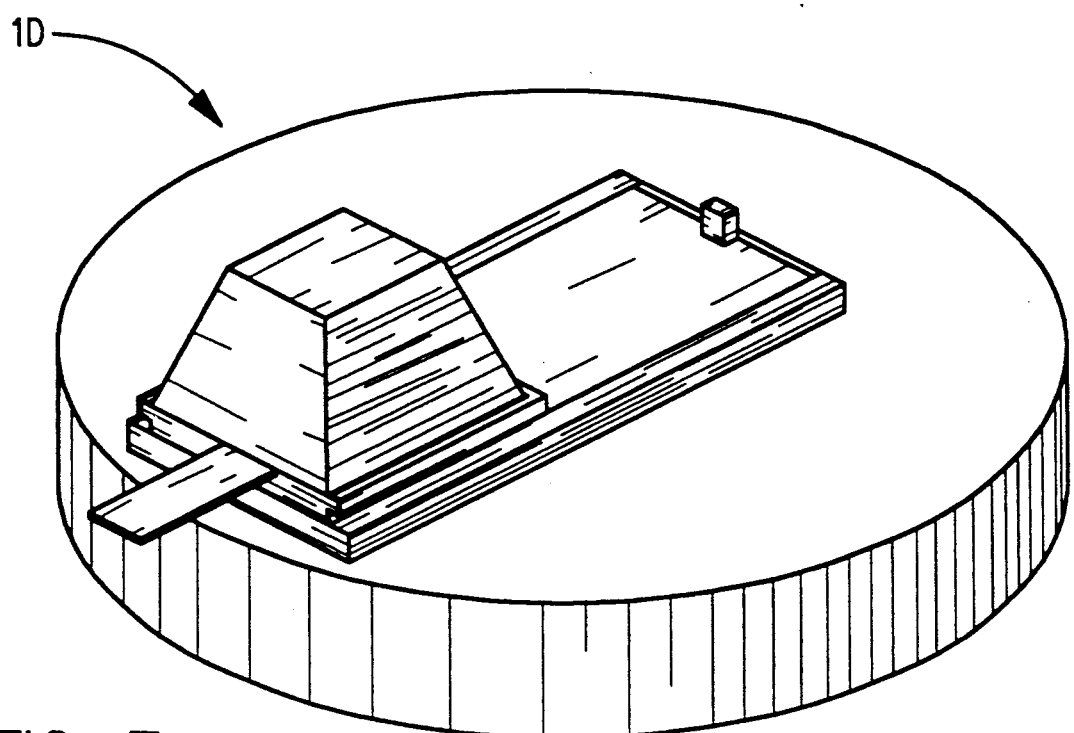
FIG. 7 is a three-dimensional view of a fourth embodiment of the dispensing cap of the invention, in the open position.
Figure 8:
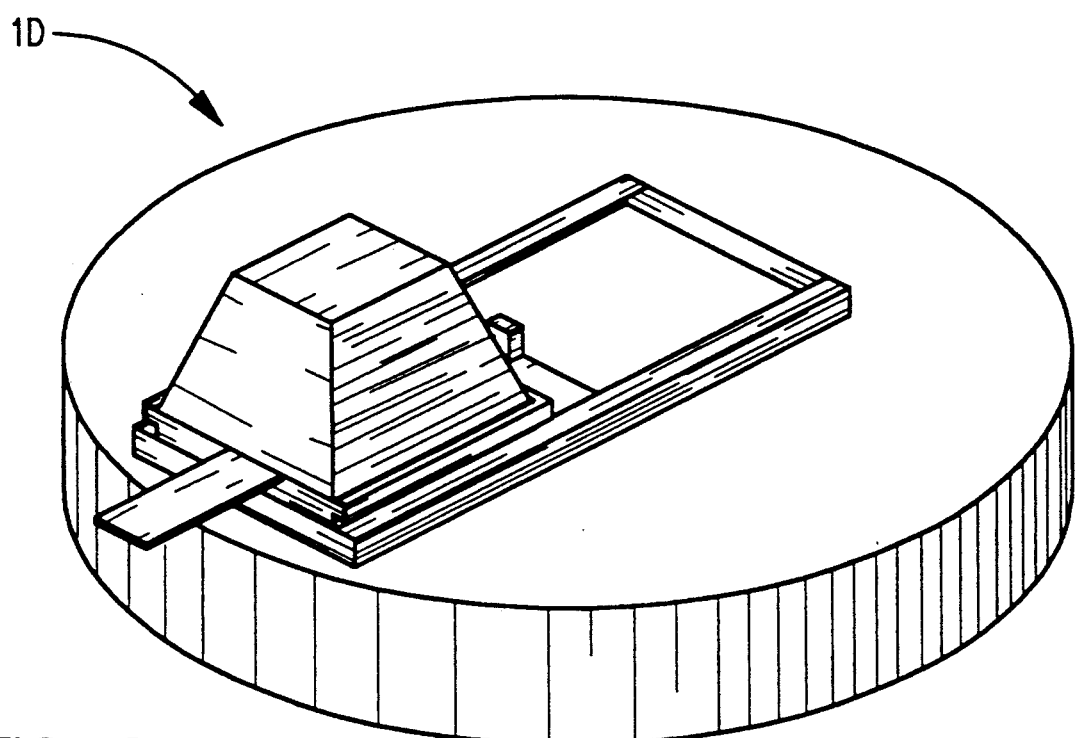
FIG. 8 is a three-dimensional view of the dispensing cap illustrated in FIG. 7, but in the closed position.

In the previously described form of compartment 5 (at best shown in FIG. 11), the compartment 5 is a single sub-assembly with the positioning means 37 being integrally molded with or otherwise secured to the railing means 4. However, and particularly in the embodiment of FIGS. 7 and 8, positioning means 37c may be two parts comprising the compartment support means 33 being integrally molded with or otherwise secured to the railing means 4b and a outwardly turned runner 36 extending from the top edge 16. The construction of the compartment support means 33 may be as that exemplarily depicted in FIG. 12 comprising the inverted L-shaped strip arranged to form a track, preferably in the shape of a letter "U" in which compartment 5c slides freely back and forth and situated so as to permit the compartment 5c to line up with the opening 8. The runner 36 is spaced and shaped so that it grasp and slides within the compartment support means 33 as shown in FIG 14. In such a construction, the positioning means 37c is slidably received and confined laterally and vertically in the compartment support means 33 when the compartment 5c is inserted into the compartment support means 33. It is understood that other shapes of strips are also within the scope of the invention providing that the formed tracks allow the compartment 5c to slide freely back and forth therein. As shown in FIGS. 5 and 6, the compartment 5c is slidable relative to the main body 2 over its top. Therefore, this forms of the compartment 5c is preferably adapted so as to be readily inserted in supported position within the support means 33. The compartment 5c may include a handle 34 to facilitate handling thereof. The handle 34 which is preferably integrally connected with the front wall 11 in such manner as to permit the handle 34 to be easily grasped between the fingers.

Different forms of the compartment 5c, such as a scoop or cup, may also be employed, although the spoon is preferred. While not needed, it is possible to have a gasket (not shown) positioned around the positioning means 37c which acts to seal the spacing between the compartment 5c and the support means 33. It is further within the contemplation of the present invention to utilize a plurality of detachable compartments having volumes relative to one another. The just described forms of the invention, the compartment 5c and the handle 34, as the case may be, are most preferably incorporated in a one piece plastic, molded construction and are made elastic or inelastic by designing them to be thick or thin, respectively, in cross section.

Generally, in order to preserve the remaining contents of the container and to substantially seal those contents from the environment, the slider may remain in the opening-closed position. It will further be appreciated that by placing the compartment 5c back in the compartment support means 33 not only a double-seal is provided but also a contamination of internal surface of said member is prevented. Alternatively the slider 3b may lie in the opening-open position during storage with solely the compartment 5b affording the substantial seal for the container. As a result of my construction of the dispensing cap, it will be evident that a user, no matter how hurried or careless one may be, is assured of a uniformity of quantity of the measured and dispensed dry material. Furthermore, the inclusion of the runner 36 and compartment support means 33 also serves to provide additional support along the length of the railing means 4. This change is purely a constructional one and otherwise does not change or affect the remainder of the structure and the mode of operation thereof.

The exemplary fourth embodiment of the dispensing cap according to the present invention is depicted in FIGS. 7, 8, 13 and 15, inclusive, and incorporates the compartment 5c that has the positioning means 37c. Since the views illustrate a very slight modification of said positioning means, it will be designated by similar reference numerals, followed by the letter d. However, it will be noted that the only difference in the compartment 5c is in the detachable portion thereof, indicated at 5d, which is similar in volumetric capacity than the original compartment 5c previously described. Indeed, a direct comparison of the same, as shown in detail in FIG. 15 indicates clearly that compartment 5d has the runner 36d does not outwardly extend from the top edge 16, but instead integrally attaches to the outer portions of the walls 12 and 14 and are so spaced from, preferably parallel to, the top edge 16 so as to provide the protruded top edge 16d enabling thereby the top edge 16d to be held directly over the opening of the container to which the dry material is transferred. Preferably, the runner 36d is positioned on and integrally connected to said walls so as to be received by the compartment support means 33 which comprise, in lieu of the inverted L-shaped strip of FIG. 12, the preferably S-shaped strip arranged to form a U-shaped track illustrated in FIG. 13 and designated 33d. Optionally, the top edge 16 can be rounded so that the compartment 5d can be conveniently and partially received within the mouth of the mouth of said container. This change is purely a constructional one for the purpose of maximizing the simplicity of dispensing operation while using the embodiment just described, and otherwise does not change or affect the remainder of the structure and the mode of operation thereof.

It is to be understood that all or some of the alternatives are interchangeable in any of the embodiments. Where parts are substantially the same they are labelled with the same numbers.

It is also within the scope of the present invention that the main body 2 may be incorporated within the container itself so that the sliding means 3 is disposed internally within the container to open and close the passage within the neck of the container.

The dispensing cap 1 is preferably made of either a pliable but durable plastic-molded material, such as Lexan or a low friction material such as nylon or polyethylene to provide an increased measure of safety, since the material will prevent the user from breaking the means during ordinary operation. In Particular, the main body 2 is preferably formed of a rigid or semi-rigid plastic material by injection molding. Such an injection molded plastic construction is economically manufactured, durable in use, easy to maintain, and aesthetically pleasing. However, the dispensing cap 1 can be made out of a number of other materials including paper, cardboard, metal, or any combination of materials which would enable production in quantity at low cost; the device could be made of a transparent, opaque or solid-color material. The term "transparent", as used herein, is intended to have a very broad meaning including materials which are substantially reduced transparency of clear acrylic resin material of the kind commonly known as "Plexiglass" or transparency of the kind commonly found in clear glass. It should be noted that the above indicates only certain preferred materials, but it should be clearly understood that it is not limited to being construed of any said representative materials specifically, but may be made of any suitable material which are obvious to those skilled in the art. While a wide choice of materials are available with which to construct the various components of the dispensing cap of the invention it will, of course, be apparent that some of the materials, particularly detergents, are of a toxic and corrosive nature with respect to certain materials. The choice of material employed in constructing the main body, compartments, railing means, sliders, and the like, should keep these factors in mind.

The terms "opening-open position" and "open position" are used exchangeably and, as used herein, are intended to mean that the slider obstruct the opening between the container and compartment (or subcompartment) to prevent flow of dry material form the container through the opening.

The terms "opening-closed position" and "closed position" are used exchangeably and, as used herein, are intended to mean that flow of dry material form the container through the opening is not obstructed by the slider.

As to the manner of usage and operation of the instant invention, the same should be apparent from the above description, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Although the invention has been described with a certain degree of particularity, it is understood that the present disclosure has been made only by way of example and that numerous changes in the details of construction and the method of combining parts may be made without departing from the spirit and the scope of the invention as hereinafter claimed.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent:

1. A dispensing cap for measuring and dispensing dry material from an open ended container comprising, in combination, a main body, a railing means, a slider and a compartment, wherein:
   (a) the main body is attachable across the open end of said container and having a base, an opening and skirt, wherein said skirt is integrally connected with said base and fitted for engagement with the open end of said container and said opening is in direct communication with the interior of the container, and said base receives and holds the railing means on the surface thereof;
   (b) the railing means positions a compartment above the opening of said base and guides a slider in a space between said main body and compartment; said railing means having at least two railing members being shaped and positioned for closely positioning and guiding said slider and said compartment;
   (c) the slider covers and uncovers the opening in said main body such that when the slider is in the open position, the compartment and interior of the container are in direct communication; and
   (d) the compartment receives said dry material from said container and has a top edge and at least one fixed volume and a means for external delivery of the measured content of said compartment, and said top edge defining an open top corresponding at least in part to the opening in the base.

2. The structure set forth in claim 1 wherein:
said railing means has an upper portion and a lower portion and comprises a pair of railing members horizontally disposed and fixed to a surface of the main body, the railing means and the surface of the main body together defining a horizontally disposed guiding path for rotary movement of the slider along the bottom surface of the plate in a surface to surface contact therewith;
said slider is rotably mounted in the slide track and positioned to slide parallel to the surface of the base; said slider comprising at least one aperture, at least one travel-limiting means, a grasping means and a cutout; said aperture having the shape substantially similar to the shape of said top edge; said travel-limiting positively defining the position when the corresponding aperture is substantially aligned with said top edge; and
said compartment having a positioning means fixedly connected to the upper portion of said railing means.

3. The structure set forth in claim 2 wherein the compartment has a front wall, a rear wall and at least a pair of spaced sidewalls; said walls being integrally connected therearound; and wherein said means for external delivery is a tiltable bottom plate having a hinge and a closure member keeper, said hinge being attached to the bottom plate and the lower portion of the rear wall, and being releasably attached to said front wall by means of the engagement of a pivotal closure member attached to the lower portion of said front wall and said closure-member keeper.

4. The structure set forth in claim 3 wherein said means for external delivery is a tiltable bottom plate having a hinge and a closure member keeper, said hinge being attached to the bottom plate and the lower portion of the rear wall, and being releasably attached to said front wall by means of the engagement of a pivotal closure member attached to the lower portion of said front wall and said closure-member keeper.

5. The structure set forth in claim 4 wherein the compartment further includes at least one partition wall fixedly disposed within a cavity thereof for dividing said compartment into a plurality of sub-compartments of fixed volumes.

6. The structure set forth in claim 5 wherein the railing members are substantially circular, in planar cross-section.

7. The structure set forth in claim 6 wherein the slider is disc-like in shape.

8. The structure set forth in claim 7 wherein the slider has two apertures.

9. The structure set forth in claim 1 wherein:

said railing means has an upper portion and a lower portion and comprises a pair of railing members horizontally disposed and fixed to a surface of the main body, the railing means and the surface of the main body together defining a horizontally disposed guiding path for rotary movement of the slider along the bottom surface of the plate in surface to surface contact therewith;

said slider is slidably mounted in the slide track and positioned to slide back and forth parallel to the surface of the base; said slider being substantially rectangular in shape and having a distal end and a proximal end, and having a grasping means at the distal end and a bevelled edge at the proximal end; and said compartment having a positioning means fixedly connected to upper portion of said railing means.

10. The structure set forth in claim 9 wherein the compartment has a front wall, a rear wall and at least a pair of spaced sidewalls; said walls being integrally connected therearound; and wherein said means for external delivery is a tiltable bottom plate having a hinge and a closure member keeper, said hinge being attached to the bottom plate and the lower portion of the rear wall, and being releasably attached to said front wall by means of the engagement of a pivotal closure member attached to the lower portion of said front wall and said closure-member keeper.

11. The structure set forth in claim 10 wherein said means for external delivery is a tiltable bottom plate having a hinge and a closure member keeper, said hinge being attached to the bottom plate and the lower portion of the rear wall, and being releasably attached to said front wall by means of the engagement of a pivotal closure member attached to the lower portion of said front wall and said closure-member keeper.

12. The structure set forth in claim 11 wherein the compartment further includes at least one partition wall fixedly disposed within the cavity thereof for dividing said compartment into a plurality of sub-compartments of fixed volumes.

13. The structure set forth in claim 12 wherein the railing means is in a form of substantially rectangular frame, in planar cross-section.

14. The structure set forth in claim 1 wherein:

said railing means has an upper portion and a lower portion and comprises a pair of railing members horizontally disposed and fixed to a surface of main body, the railing means and the surface of the main body together defining a horizontally disposed a guiding path for rotary movement of the slider along the bottom surface of the plate in surface to surface contact therewith;

said slider is slidably mounted in the slide track and positioned to slide back and forth parallel to the surface of the base; said slider being substantially rectangular in shape and having a distal end and a proximal end, and having a grasping means at the distal end and a bevelled edge at the proximal end; and said compartment having a positioning means further comprising a compartment guiding means, a runner and a air vent; said compartment guiding means forming a guiding path for said runner and being fixedly connected to upper portion of said railing means; said runner extending outwardly from said top edge.

15. The structure set forth in claim 14 wherein the compartment is selected from the group consisting a scoop, a spoon and a cup.

16. The structure set forth in claim 15 wherein the said means for external delivery is a handle.

17. The structure set forth in claim 16 wherein the said top edge is a protruded edge.

* * * * *